United States Patent
Garcia et al.

(10) Patent No.: US 8,189,791 B2
(45) Date of Patent: May 29, 2012

(54) HIERARCHICAL DETERMINISTIC PAIRWISE KEY PREDISTRIBUTION SCHEME

(75) Inventors: Oscar Garcia, Aachen (DE); Heribert Baldus, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 819 days.

(21) Appl. No.: 12/305,449

(22) PCT Filed: Jun. 19, 2007

(86) PCT No.: PCT/US2007/071550
§ 371 (c)(1),
(2), (4) Date: Dec. 18, 2008

(87) PCT Pub. No.: WO2007/149850
PCT Pub. Date: Dec. 27, 2007

(65) Prior Publication Data
US 2009/0129599 A1    May 21, 2009

Related U.S. Application Data

(60) Provisional application No. 60/805,490, filed on Jun. 22, 2006.

(51) Int. Cl.
*H04L 29/06* (2006.01)
(52) U.S. Cl. .................................... 380/279
(58) Field of Classification Search .................. 380/279
See application file for complete search history.

(56) References Cited

U.S. PATENT DOCUMENTS 6,240,188 B1 *  5/2001  Dondeti et al. ............... 380/284
(Continued)

FOREIGN PATENT DOCUMENTS

| WO | 0103364 A1 | 1/2001 |
| WO | 2005062232 A2 | 7/2005 |
| WO | 2005062331 A1 | 7/2005 |

(Continued)

OTHER PUBLICATIONS

Chuang, P-J, et al.; A Scalable Grouping Random Key Predistribution Scheme for Large Scale Distributed Sensor Networks; 2005; Proc. of the Third Int'l Conf. on Information Technology & Applications; vol. 2:535-540.

(Continued)

*Primary Examiner* — Michael S McNally (57) ABSTRACT

A security system for a hierarchical network (10) includes L hierarchical levels each corresponding to a security domain level (16), and a plurality of local network nodes (A, B, . . . , Z). A keying material generator (24) generates a set (30) of correlated keying material for each network node. Each set (30) of keying material is composed of L sub-sets (32) of keying material one for each security domain level (16). A set up server (34) distributes the generated sets (30) of keying material to each network node (A, B, . . . , Z) to enable the network nodes (A, B, . . . , Z) to communicate with one another at a security domain of a hierarchical level k by a use of a corresponding sub-set (32) of the security keying material.

22 Claims, 4 Drawing Sheets

U.S. PATENT DOCUMENTS

| | | | |
|---|---|---|---|
| 2005/0097317 A1* | 5/2005 | Trostle et al. | 713/163 |
| 2005/0099974 A1* | 5/2005 | Kats et al. | 370/328 |
| 2005/0132166 A1* | 6/2005 | Saffre | 712/26 |
| 2006/0083377 A1 | 4/2006 | Ptasinski | |
| 2008/0016550 A1* | 1/2008 | McAlister | 726/1 |

FOREIGN PATENT DOCUMENTS

| | | |
|---|---|---|
| WO | 2005096568 A1 | 10/2005 |
| WO | 2006003532 A1 | 1/2006 |
| WO | 2006131849 A2 | 12/2006 |

OTHER PUBLICATIONS

Morchon, O. G., et al.; Resource-Efficient Security for Medical Body Sensor Networks; 2006; Proc. of the Int'l Workshop on Wearable & Implantable Body Sensor Networks; pp. 80-83.

Song, W. J., et al.; Privacy and Security Control Architecture for Ubiquitous RFID Healthcare System in Wireless Sensor Networks; 2006; Int'l Conf. on Consumer Electronics; pp. 239-240.

* cited by examiner

HIERARCHICAL DETERMINISTIC PAIRWISE KEY PREDISTRIBUTION SCHEME

CROSS REFERENCE TO RELATED APPLICATIONS

This application claims the benefit of U.S. provisional application Ser. No. 60/805,490 filed Jun. 22, 2006, which is incorporated herein by reference.

DESCRIPTION

The present application relates to wireless networks. It finds particular application in conjunction with medical wireless ad hoc sensor network systems and will be described with particular reference thereto. However, it is to be appreciated that the invention will also find application in conjunction with other network systems and the like.

Typically, wireless mobile ad hoc networks are deployed in hospitals and medical facilities for medical patient care and monitoring. Commonly, a medical mobile ad hoc network is established around a patient or a small group of patients forming a body sensor network (BSN). Typically, the BSN includes wireless sensors or medical devices attached to a patient's body and/or disposed in the close vicinity of the patient. In the body sensor network, medical devices communicate peer-to-peer. Each device offers a set of medical services and demands access to a set of medical services on other devices. The access to such devices is also given to the clinicians who, for example, using a PDA can trigger an infusion pump to administer morphine to a patient.

It is essential to ensure that only the right entities access medical mobile ad hoc networks, and to ensure confidentiality and integrity of wireless communications. In the example discussed above, the doctor can trigger an infusion pump to administer morphine to a patient, but an aide who is not authorized to administer medications should be restrained from such an act. Security is a mandatory requirement for such systems in order to ensure patient safety and privacy and comply with legal requirements in the healthcare such as HIPAA in the USA.

Entity authentication is the basis for subsequent access control and establishment of protected communication. Entity authentication protocols, which are typically used in infrastructure networks, are based on the key cryptography known in the art. Typically, the security keys in such systems are distributed directly to all sensor nodes known in the system. For example, the identity-labeled pairwise symmetric keys are pre distributed to all mobile nodes before deployment. The keys all have the same security level. Such key distribution scheme addresses flat networks, i.e. each and every device has an identical ability to communicate with each other.

However, hospital's infrastructure is essentially hierarchical. In some cases the sensor nodes are being used in different organizations, e.g. different departments of the same hospital or different hospitals of the same entity. In such systems, a single security break compromises security and integrity of each sensor belonging to the system.

The present application provides new apparatuses and methods which overcome the above-referenced problems and others.

In accordance with one aspect, a security system for a hierarchical network including L hierarchical levels each corresponding to a security domain and a plurality of local network nodes is disclosed. A keying material generator generates correlated sets of keying material for each node. Each correlated set of keying material includes L keying material sub-sets, each corresponding to an associated security domain. A set up server distributes the generated sets of keying material to each network node to enable the network nodes to communicate with one another at a security domain of a hierarchical level k by using a corresponding sub-set of keying material.

In accordance with another aspect, a method of hierarchical security management is disclosed. Correlated keying material sets are generated for each network node which each includes L keying material sub-sets each corresponding to a security domain associated with one of a plurality of hierarchical levels L. The generated keying material sets are distributed to the network nodes. Communications between the network nodes are established at a common security domain associated with a hierarchical level k by a corresponding sub-set of the keying material.

In accordance with another aspect, a network device is disclosed. The network device includes a predistributed set of keying material each including at least a lowest level keying material sub-set associated with a lowest level security domain, and a higher level keying material sub-set associated with a higher level security domain. The network device is programmed to authenticate other network devices at the lowest level common security domain and communicate with one another with the sub-set associated with the lowest common security domain.

In accordance with another aspect, a network is disclosed. A plurality of first network devices communicates with each other in a first lower level security domain and with other devices in a higher level security domain. A plurality of second network devices communicates with each other but not with the first network devices in a second lower level security domain different from the first lower level security domain and with the first network devices in the higher level security domain.

One advantage is that access to a security domain is substantially limited.

Advantages of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

Figure 1:
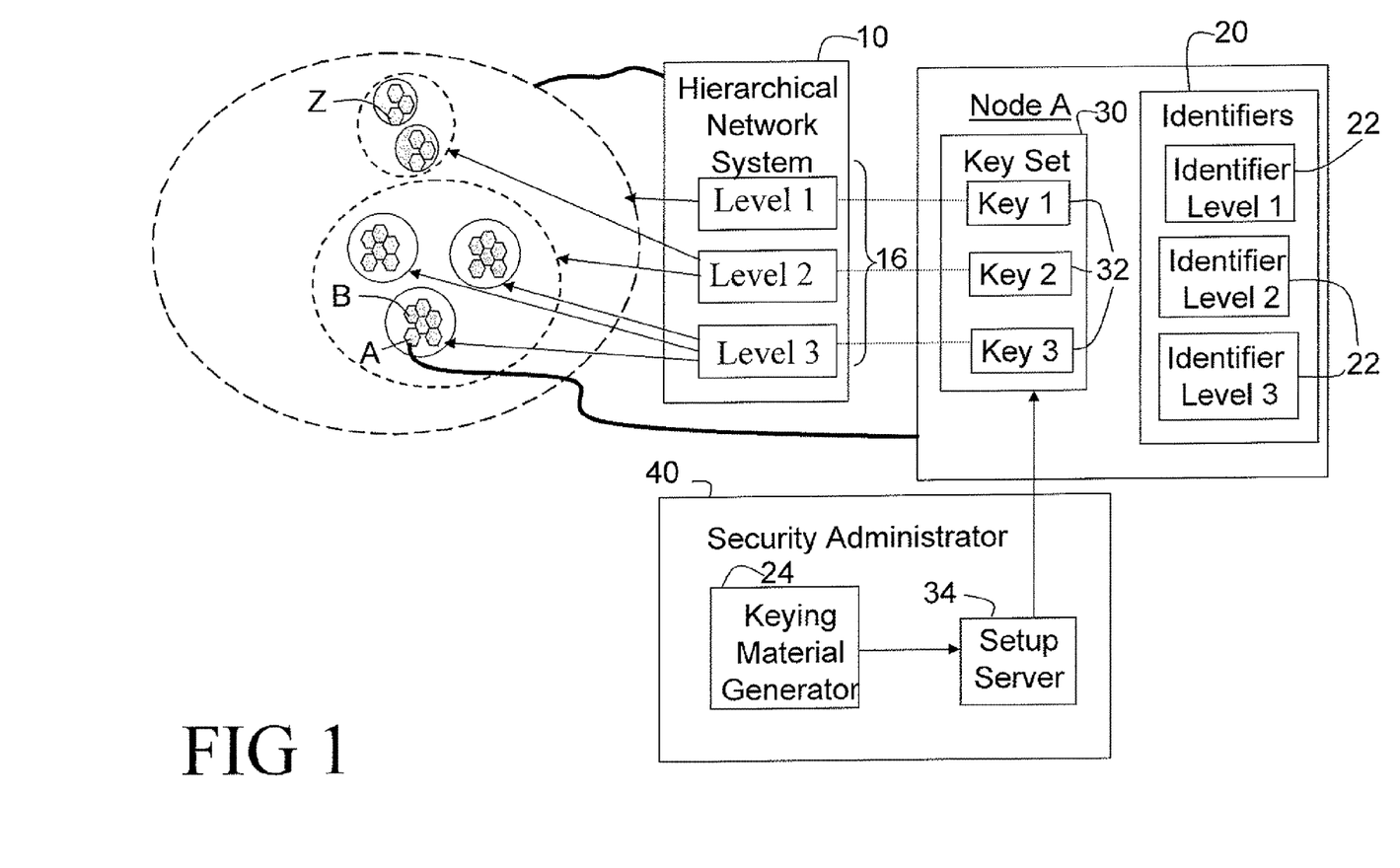
FIG. 1 is a diagrammatical illustration of a hierarchical network system.
Figure 2:
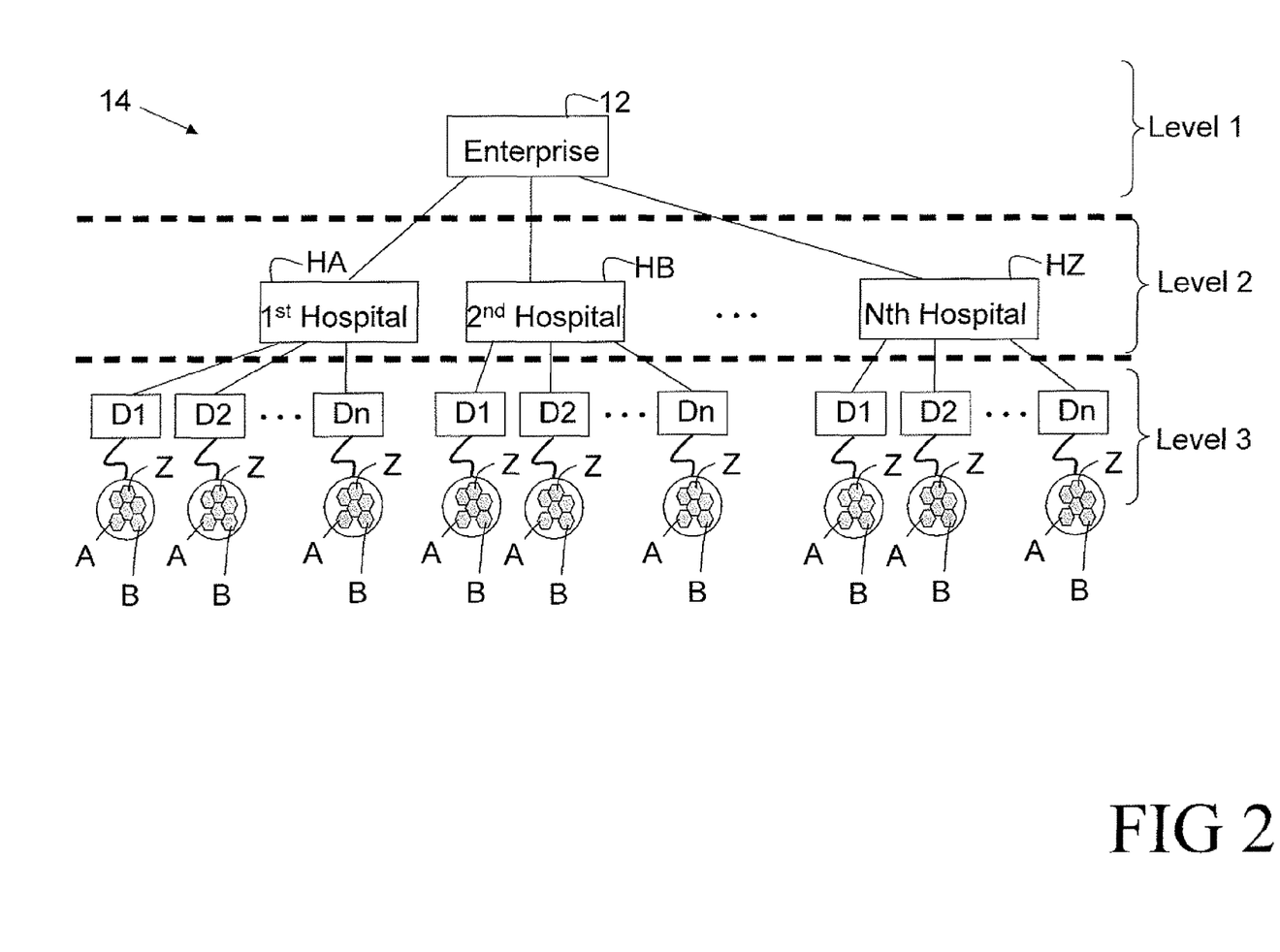
FIG. 2 is a diagrammatical illustration of a detail of a hierarchical infrastructure.

With reference to FIGS. 1 and 2, a hierarchical network system 10 includes mobile nodes or devices (A, B, . . . , Z) owned by a single entity, e.g. an enterprise 12, which mobile devices (A, B, . . . , Z) operate in a hierarchical infrastructure 14 having L hierarchical or security levels or domains 16 such as a first level (level 1), a second level (level 2) and a third level (level 3), e.g. the number of levels is equal to 3. Of course, it is contemplated that the hierarchical infrastructure 14 can have fewer or larger number of security domains 16 such as 2, 4, 5, etc. Each mobile device (A, B, . . . , Z) includes a set 20 of L device identifiers (IDs) 22 each corresponding to a single security domain 16. Initially, before deployment, a keying material generator 24 generates a correlated keying material set 30 for each mobile device (A, B, ..., Z). Each keying material set 30 is composed of L keying material sub-sets 32, each keying material sub-set 32 corresponding to an associated security domain 16. A set up server 34 pre-distributes the keying material sets 30 among mobile devices (A, B, ..., Z). Each set 30 includes the keying material allowing the mobile devices (A, B, ..., Z) to communicate in accordance with the hierarchical structure 14 of the network system 10. In the operation mode, each pair of the mobile devices (A, B, ..., Z) establishes a pairwise key by exchanging their device identifiers, searching the deepest common security domain and using the corresponding keying material sub-set.

In the exemplary embodiment, the mobile nodes (A, B, ..., Z) are set to communicate at the lowest security domain level by default and can communicate at the higher security levels only by a special request. More specifically, the mobile devices (A, B, ..., Z) communicate in two different communications modes, such as a normal communication mode (NCM) and an unusual communication mode (UCM). The normal communication mode takes place if the deepest common security domain k equals the lowest security domain L. The unusual communication mode occurs when the deepest common security domain k is a higher level security domain than the lowest level security domain L. In the example above, the lowest security domain is level 3. The normal communication mode will occur at level 3. The unusual communication mode will occur at levels 2 or 1. Typically, the mobile nodes which have common security domains at the lowest level L are deployed in close vicinity, e.g. such nodes belong, for example, to the same hospital department. Hence, most of the communications are processed in the normal communication mode. As described in detail below, in operation, each pair of the mobile devices (A, B, ..., Z) discovers the deepest level of the common security domain, exchanges identifiers of the discovered common security level, and establishes the pairwise key at the common security level. Unusual communication mode can occur, for example, if a mobile device moves from one location to another. For example, when the device moves from one department to another within the same hospital, the device itself or other devices notify a security administrator 40 and request permission to establish communications at a higher level. In this manner, the security administrator 40 can keep track of the devices which communicate outside of the lowest security level, e.g. in the unusual communication mode.

With continuing reference to FIGS. 1 and 2, security level 1 identifies a top security domain belonging to, for example, the enterprise 12. For example, security level 2 identifies the next to the top security domain, for example, the security domain of the hospitals or clinics HA, HB, ..., HZ which belong to the enterprise 12. Security level 3, for example, identifies n departments D1, D2, ..., Dn within the hospitals HA, HB, ..., HZ. Therefore, the mobile nodes (A, B, ..., Z) are capable of communicating at the department, hospital and enterprise level by a use of the specific key which includes a keying material for a corresponding security domain.

With continuing reference to FIG. 1, each department's security domain network typically includes up to 1000 self-organized nodes (A, B, ..., Z). Any combination of the nodes may be connected by wireless single-hop links with no fixed network infrastructure support to compose a body sensor network (BSN). Preferably, the mobile nodes (A, B, ..., Z) include physiological monitoring devices, controlled medication administration devices, PDA-like devices, embedded computing systems, or the like devices. For example, one network may include nodes for each physiological monitor, medication administration device, computer-based patient ID, attending physician's PDA, and the like, but specifically excluding like devices associated with other patients. Each mobile node (A, B, ..., Z) offers one or more network services. Each node (A, B, ..., Z) can communicate peer-to-peer with any other node in the network system 10 via transmitting/receiving means to access one or more services. Peer-to-peer communications is preferably unidirectional and bi-directional and can be synchronous and asynchronous. Of course, it is also contemplated that a physician can access the node (A, B, ..., Z) to provide a service to the patient, e.g. administer a medication, check a status of the monitoring equipment, and the like, by using a portable computer, PDA, or the like.

In the deterministic pairwise key predistribution scheme (DPKPS), before deployment of the nodes (A, B, ..., Z), the nodes (A, B, ..., Z) are initialized with a unique device keying material. Each device keying material is unambiguously associated with this device identifier. In operation, any pair of devices with the predistributed keying material can authenticate one another. E.g., two devices that belong to the same security domain can use the predistributed keying material to establish a pairwise symmetric key if the two devices unambiguously identify one another via associated identification devices.

DPKPS keying material is based on two concepts: symmetric bivariate polynomials and finite projective planes (FPP). A symmetric bivariate polynomial (BPs) is a polynomial of degree λ on two variables over a finite field $F_q$ with the property:

$$f(x,y)=f(y,x).$$

A FPP refers to a combinatorial distribution of $n^2+n+1$ elements into $n^2+n+1$ different groups. Each group is composed of n+1 distinct elements and any pair of groups shares an element, where n in one embodiment is a prime power number.

By using both above concepts, the set up server generates a total of $n^2+n+1$ BPs and distribute BPs into $n^2+n+1$ blocks according to an FPP of order n. Thus, any pair of blocks shares a BP, $f_i(x,y)$. Afterwards, the set-up server evaluates the n+1 BPs of each block in x variable for q/(n+1) different points (q is the size of the finite field), generating from each block a total of q/(n+1) sets of n+1 univariate polynomials (UPs). Keying material for each device is composed of a set of UPs and that device identifier, i.e. the identifiers of the BPs, which the UPs are derived from, and the points, which the BPs where were evaluated in.

For example, the keying material of the devices A and B is respectively composed of the UPs:

{$f_1(ID_{A1}, y), f_2(ID_{A2}, y), f_4(ID_{A4}, y)$};
{$f_3(ID_{B3}, y), f_4(ID_{B4}, y), f_6(ID_{B6}, y)$}

Device IDs of the devices A and B are respectively:

{{$f_1, f_2, f_4$} {$ID_{A1}, ID_{A2}, ID_{A4},$}},
{{$f_3, f_4, f_6$} {$ID_{B3}, ID_{B4}, ID_{B6},$}}, where $f_i$s identify original BPs and $ID_{Zi}$s identify the point where polynomial $f_i$ was evaluated for device z.

In order for the devices A and B to establish a pairwise key, devices exchange the devices IDs. Each device uses the device IDs in two distinct sub-phases. More specifically, a device compares its own device IDs with device IDs of the other party, finding out the UP generated from a common BP. In above example common BP is $f_4(x,y)$. Device A owns the common UP$f_4(ID_{A4}, y)$ and device B owns the common UP $f_4(ID_{B4}, y)$. Each device computes the pairwise key by evaluating its share UP in the evaluation point of the other party, i.e., device A evaluates $f_4(ID_{A4}, y)$ in $y=ID_{B4}$ and device B evaluates $f_4(ID_{B4}, y)$ in $y=ID_{A4}$. Because of the symmetry property of BPs both devices obtains the same pairwise key $K_{AB}=f_4(ID_{A4}, ID_{B4})=f_4(ID_{B4}, ID_{A4})$.

Similarly to what is described above, in hierarchical deterministic pairwise key predistribution scheme (HDPKPS), unique keying material is predistributed to every device. Keying material determines L security domains a device belongs to within of an L-level hierarchical infrastructure of security domains. HDPKPS keying material is unambiguously associated to the device identifier. In the operation, any pair of devices can use their keying material to establish a pairwise symmetric key, at least at the highest security level. Particularly, any two devices can establish a pairwise key at a security level k if (i) both devices belong to the same security domain at level k; and (ii) both devices can unambiguously identify each other through the device identifier at level i, $i \leq k$.

HDPKPS keying material of layer k is called $KM_k$, and divides this level into a number of security domains that are associated both with upper and lower security domains. Therefore, HDPKPS keying material is composed of L sets of DPKPS keying material as well as the HDPKPS device identifiers. HDPKPS device identifiers are composed of L security domains identifiers and L sets of DPKPS device identifiers.

For example, the keying material of level 1 ($KM_1$) is comprised of one security domain and defined by DPKPS keying material with parameters $\lambda_1$ and $n_1$. Given $n_1$, order of the FPP distribution at level 1, $KM_1$ may be divided into up to $n_1^2 + n_1 + 1$ groups. Each group corresponds with a column of the FPP distribution, i.e., keying material in each group is generated from the same set of BPs.

For example, the keying material of level 2 ($KM_2$) is comprised of up to $n_1^2 + n_1 + 1$ sub-security domains. Sub-security domain $i_2$ at level 2 is called $SD_{2i_2}$ and defined by the DPKPS keying material with parameters $\lambda_{2i_2}$ and $n_{2i_2}$. A device belonging to the sub-security domain $SD_{2i_2}$ includes keying material at level 1 $KM_1$ of column i.

Generally, keying material at level k ($1 \leq k \leq L$) is defined as $KM_k$ and comprised of up to:

$$(n_1^2 + n_1 + 1) \left( \sum_{i_2=1}^{n_1^2+n_1+1} (n_{2i_2}^2 + n_{2i_2} + 1) \cdot \left( \sum_{i_3=1}^{n_{2i_2}^2+n_{2i_2}+1} (n_{3i_2i_3}^2 + n_{3i_2i_3} + 1) \right) \cdots \sum_{i_k=1}^{n_{k-1i_2\cdots i_{k-1}}^2+n_{k-1i_2\cdots i_{k-1}}+1} (n_{ki_2i_3\cdots i_{k-1}}^2 + n_{ki_2i_3\cdots i_{k-1}} + 1) \right)$$

sub-security domains. A security domain $i_k$ at level k, sub-security domain of $SD_{k-1i_2i_3\ldots i_{k-1}}$, is called $SD_{ki_2i_3\ldots i_{k-1}i_k}$ and defined by DPKPS keying material with parameters $\lambda_{ki_2i_3\ldots i_{k-1}i_k}$ and $n_{ki_2i_3\ldots i_{k-1}i_k}$. A device belonging to $SD_{ki_2i_3\ldots i_{k-1}i_k}$ at level k, includes keying material at level r with $r<k$ $KM_r$ of $SD_{ri_2i_3\ldots i_{r-1}}$ and column $i_r$.

Figure 3:
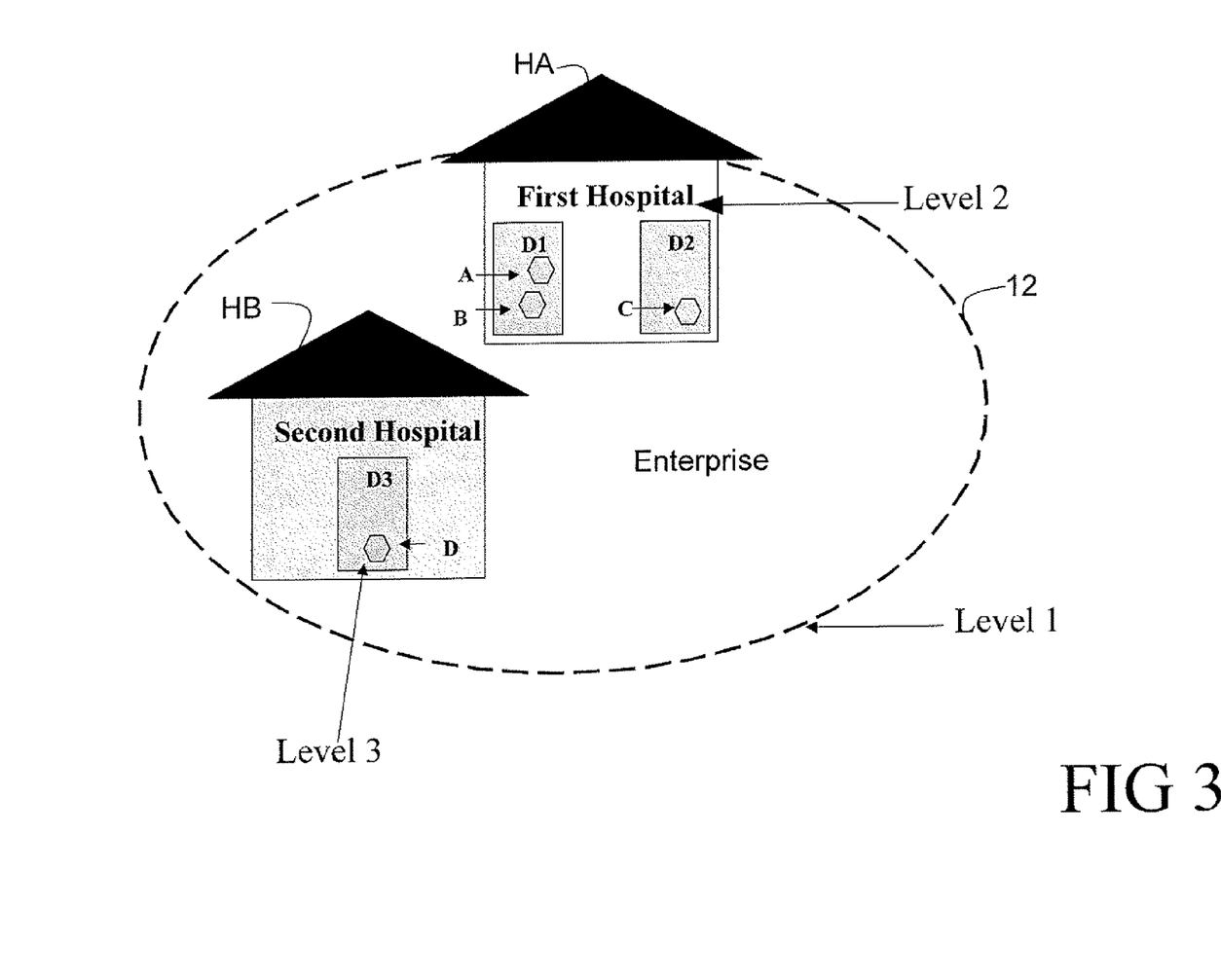
FIG. 3 is a diagrammatical illustration of an example of a hierarchical infrastructure.

With reference to FIG. 3, a first hospital HA includes first and second departments D1 and D2. A second hospital HB includes a third department D3. The first department D1 of the first hospital HA includes first and second mobile devices A, B. The second department D2 of the first hospital HA includes a third device C. The third department D3 of the second hospital HB includes a fourth device D. In this exemplary embodiment, the first and second devices A, B may establish a pairwise key by using keying material of the lowest security level 3, e.g. communicate in the normal communication mode within the first department D1. Further, the first and second devices A, B each may establish a pairwise key with the third device C by using keying material of the second lowest security level 2, e.g. communicate in the unusual communication mode within the first hospital HA. Finally, the fourth device D can only communicate with the first, second and third devices A, B, C via the top security level 1, e.g. in the unusual communication mode within the enterprise 12.

Figure 4:
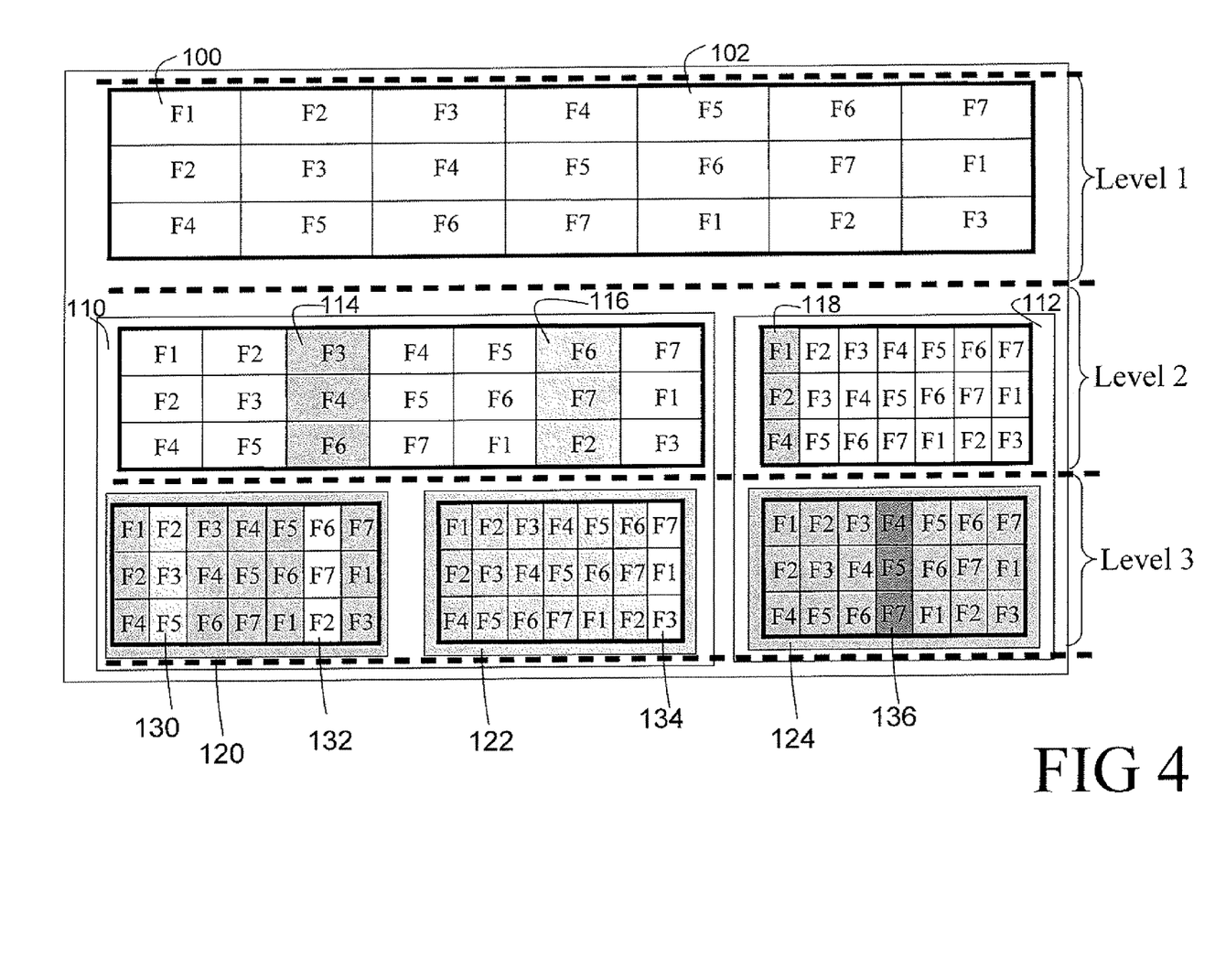
FIG. 4 is an example of distribution of the keying material for the system of FIG. 3.

With reference to FIG. 4, at the top level 1, the mobile devices A, B, C, D own correlated DPKPS keying material. The first, second and third devices A, B, C own the keying material generated from bivariate polynomials F1, F2, F4 from an FPP block 100 and the fourth device D owns the keying material generated from the bivariate polynomials F5, F6, F1 from an FPP block 102. The mobile devices A, B, C, D own a correlated univariate polynomials F1 which would allow communications among the mobile devices A, B, C, D at the top level 1. At the next to top level 2, first and second sets 110, 112 of the DPKPS keying material are generated, for the first and second hospitals HA and HB respectively, which, at level 2, are in distinct security domains. The first and second mobile devices A, B own the keying material generated from bivariate polynomials F3, F4, F6 from an FPP block 114 of the first set 110. The third mobile device C owns the keying material generated from bivariate polynomials F6, F7, F2 from an FPP block 116 of the first set 110. The first, second and third mobile devices A, B, C own a correlated univariate polynomials F6 which would allow communications between the first, second and third mobile devices A, B, C at the level 2, within the first hospital HA. The fourth device D owns the keying material generated from bivariate polynomials F1, F2, F4 from an FPP block 118 of the second set 112. Finally, at the lowest level 3, first, second and third sets 120, 122, 124 of the DPKPS keying material are generated, for the first, second and third departments D1, D2, D3, respectively, which each has a distinct level 3 security domain. The first and second mobile devices A, B receive correlated keying material generated from bivariate polynomials F2, F3, F5 and F6, F7, F2 respectively (blocks 130, 132 of the first set 120), since the first and second mobile devices A, B belong to the same department, e.g. the first department D1 of the first hospital HA. The correlated univariate polynomials F2 would allow the first and second mobile devices A, B to communicate with each other within the first department D1. The third device C receives the keying material generated from bivariate polynomials F7, F1, F3 of an FPP block 134 of the second set 122. The fourth device D receives the keying material generated from bivariate polynomials F4, F5, F7 of an FPP block 136 of the third set 124.

In the manner described above, the higher security levels, e.g. levels 1 and 2, ensure full-interoperability of the mobile devices in emergency cases. For example, when a patient carrying the first and second devices A, B is transferred from the first department D1 to the second department D2 within the first hospital HA, communications of the first and second devices A, B with other devices of the second department D2, e.g. the third device C, are securely conducted by using the keying material of the second security level 2, i.e. the first hospital keying material. Division into different security levels allows full device identification according to the hierarchical infrastructure. For instance, if the hospital devices establish a normal communication mode, e.g. the lowest level communication mode, the devices can automatically identify the origin of the other party.

HDPKPS exhibits an increased security both in the normal communication mode and unusual communication mode. In the normal communication mode, only devices at the lowest security level L (level 3 in the example) communicate with each other by using the keying material of the lowest level L. Because the number of devices at this level is relatively low (<1000), the relative resiliency at this level is relatively high. Therefore, it is difficult for an intruder to capture enough number of devices to endanger communications at level L without causing a system alarm. In the unusual communication mode, devices can fully identify the other party, and, therefore, devices can identify possible attacks against the system. For instance, in the above example, if an intruder captures the fourth device D of the third department D3 of the second hospital HB and attempts to use it to attack the first device A of the first department D1 of the first hospital HA, the first device A (or the second device B) can detect the fourth device D as belonging to the third department D3 of the second hospital HB. In this situation, the first device A (or the second device B) can distrust the presence of the fourth device D in the first department domain and request the domain of the third department D3 of the second hospital HB to confirm the presence of the fourth device D in the first department domain.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A security system for a hierarchical network including at least two hierarchical levels each corresponding to a security domain, comprising:
a plurality of local network nodes;
a keying material generator which generates correlated sets of keying material for each network node, which each keying material set includes keying material sub-sets, each sub-set corresponding to an associated security domain including a hospital level security domain associated with a hospital and a department level security domain associated with each of a plurality of departments within the hospital; and
a set up server which distributes the generated keying material sets to each network node to enable the network nodes within each department to communicate with one another at the associated department security domain using a first corresponding sub-set of keying material and to communicate with network nodes in another department at the hospital level security domain using a second corresponding sub-set of the keying material.

2. The system as set forth in claim 1, wherein the network includes:
an enterprise level security domain associated with an enterprise, the enterprise encompassing a plurality of hospitals.

3. The system as set forth in claim 1, wherein the network nodes communicate with one another via at least a normal communication mode and an unusual communication mode.

4. The system as set forth in claim 1, wherein the network nodes include at least one of physiological condition monitors, controllable medication dosing devices, and PDAs.

5. A network node with keying material, that enables communicating at a plurality of hierarchical levels, for use in the system of claim 1.

6. A security system for a hierarchical network including L hierarchical levels each corresponding to a security domain comprising:
a plurality of local network nodes which communicate with one another via at least a normal communication mode and an unusual communication mode;
a keying material generator which generates correlated sets of keying material for each network node, which each keying material set includes L keying material sub-sets, each sub-set corresponding to an associated security domain;
a set up server which distributes the generated keying material sets to each network node to enable the network nodes to communicate with one another at a security domain of a hierarchical level k by using a corresponding sub-set of keying material; and
a security administrator from which the network nodes are programmed to request a permission to communicate in the unusual communication mode.

7. The system as set forth in claim 6, wherein the network nodes are programmed to communicate with one another at the lowest level common security domain.

8. The system as set forth in claim 6, wherein the normal communication mode includes communicating by the sub-set of keying material corresponding to the lowest level security domain L.

9. The system as set forth in claim 8, wherein the unusual communication mode includes communicating at a different level security domain than the lowest level security domain L.

10. The system as set forth in claim 6, wherein each network node includes a set of L identifiers which each identifier includes a device identifier and a security domain identifier corresponding to an associated security domain level of the L level infrastructure for the network devices to mutually authenticate one another.

11. A method of hierarchical security management comprising:
generating correlated sets of keying material for each network node which each set includes a plurality of keying material sub-sets each sub-set corresponding to a security domain associated with one of a plurality of hierarchical levels;
distributing the generated keying material sets to the network nodes; and
establishing normal communications between the network nodes at a first common security domain which coincides with a first hierarchical level by a corresponding first sub-set of the keying material; and
establishing unusual communications at a second common security domain which is different form the first hierarchical level with a corresponding second sub-set of the keying material wherein prior to establishing unusual communications, a permission is requested.

12. The method as set forth in claim 11, wherein each network node includes a set of identifiers which each includes a device identifier and a security domain identifier corresponding to an associated hierarchical level for the network devices to mutually authenticate one another.

13. The method as set forth in claim 11, wherein the network nodes include at least one of physiological condition monitors, controllable medication dosing devices, and PDAs.

14. A network having a plurality of nodes programmed for performing the method of claim 11.

15. A node used in the method of claim 11.

16. A set up server used to distribute the sets of the keying material in the method of claim 11.

17. A network device including:
   a physiological condition monitor which includes a memory configured to store a predistributed set of keying material, the set including a plurality of sub-sets of keying material arranged hierarchically in a plurality of hierarchical layers including at least:
   a lowest level keying material sub-set associated with a lowest level security domain used by the network devices to communicate securely with other network devices in one group of a family of groups of network devices in a medical facility, and
   a higher level keying material sub-set associated with a higher level security domain used by the network device to communicate securely with network devices in other of the groups of the family of groups,
   a top level keying material sub-set associated with a top security domain used by the network devices to communicate securely with other medical devices not in the family of groups;
   wherein the network device is programmed to authenticate and communicate with other network devices in the one group with the lowest level security domain with the lowest level keying material sub-set associated with the lowest level security domain;
   wherein the network device is programmed to authenticate and communicate with other network devices in other groups in the one family of groups with the higher level security domain with the higher level keying material sub-set associated with the higher level security domain; and
   wherein the network device is programmed to authenticate and communicate with other network devices in other families of groups with the top level security domain with the top level keying material sub-set associated with the top level security domain.

18. A network including:
   a predistributed set of keying material each including at least:
     a lowest level keying material sub-set associated with a lowest level security domain, and
     a higher level keying material sub-set associated with a higher level security domain,
     the network device is programmed to authenticate other network devices at the lowest level common security domain and communicate with one another with the sub-set associated with the lowest level common security domain; and
     wherein the network device is programmed to request permission to communicate at a security domain level which does not correspond to the lowest level of hierarchy of the hierarchical structure.

19. The network device as set forth in claim 18, wherein the lowest level sub-set of the keying material is used to communicate in a common security domain which corresponds to the lowest level of hierarchy of a hierarchical structure.

20. A network including a plurality of the network devices according to claim 18.

21. A network comprising:
   first, second, third, and fourth groups of network devices, each network device having:
     a memory which stores a set of keying material including a first sub-set of the keying material associated with a first security domain, a second sub-set of the keying material associated with a second security domain, and third sub-set of the keying material associated with a third security domain,
     a communication system by which the network devices authenticate and communicate with each other,
   wherein the first sub-set of the keying material is the same within each of the groups and different from group to group such that the network devices in each group authenticate and communicate with each other in their associated first security domain and cannot authenticate or communicate with network devices in a different group on their first security domains,
   wherein the second sub-set of the keying material is the same in the first and second groups such that the network devices in the first and second groups authenticate and communicate with each other in their associated second security domain,
   wherein the second sub-set of the keying material in the third and fourth groups is the same and is different form the second sub-set of the keying material in the first and second groups such that the network devices in the third and fourth groups authenticate and communicate with each other in their second security domain but not with the network devices in the first and second groups, and
   wherein the third sub-set of the keying material is the same in the first, second, third, and fourth groups such that the network devices in the first, second, third, and fourth groups authenticate and communicate with each other in the third security domain.

22. The network as set forth in claim 21, wherein at least some of the network devices further include:
   a physiological condition monitor which monitors a physiological condition of a patient with whom the network device is associated.

* * * * *